(12) United States Patent
Bradley et al.

(10) Patent No.: US 9,016,608 B2
(45) Date of Patent: Apr. 28, 2015

(54) BI-DIRECTIONAL LOCKING RETRACTOR

(71) Applicant: Intertek Industrial Corporation, Jacksonville, FL (US)

(72) Inventors: Scott Bradley, Jacksonville, FL (US); Jeff Fields, Elkhart, IN (US); Chase Parish, Oklahoma City, OK (US); Tyler Butel, Oklahoma City, OK (US)

(73) Assignee: Intertek Industrial Corporation, Jacksonville, FL (US)

( * ) Notice: Subject to any disclaimer, the term of this patent is extended or adjusted under 35 U.S.C. 154(b) by 169 days.

(21) Appl. No.: 13/836,196

(22) Filed: Mar. 15, 2013

(65) Prior Publication Data

US 2014/0217764 A1 Aug. 7, 2014

Related U.S. Application Data

(60) Provisional application No. 61/761,017, filed on Feb. 5, 2013.

(51) Int. Cl.
*B65H 75/30* (2006.01)
*A61G 1/044* (2006.01)
*A61G 1/02* (2006.01)
*B60R 22/36* (2006.01)

(52) U.S. Cl.
CPC .... *A61G 1/044* (2013.01); *A61G 1/02* (2013.01); *B60R 22/36* (2013.01)

(58) Field of Classification Search
CPC ............... B60R 2022/446; B60R 2022/4433
USPC ............ 242/381.3, 381.6, 382, 382.5, 385.2, 242/385.4
See application file for complete search history.

(56) References Cited

U.S. PATENT DOCUMENTS

| | | | |
|---|---|---|---|
| 3,147,996 A | 9/1964 | Ferrara et al. | |
| 3,248,148 A | 4/1966 | Board et al. | |
| 3,580,523 A | 5/1971 | Preston | |
| 3,700,184 A | 10/1972 | Francis | |
| 4,064,574 A | 12/1977 | Schnitzler | |
| 4,428,545 A | 1/1984 | Naitoh | |
| 4,762,089 A | 8/1988 | McNulty | |
| 4,854,522 A * | 8/1989 | Brown et al. ............... | 242/385.2 |
| 4,907,757 A * | 3/1990 | Rumpf et al. ............... | 242/385.4 |
| 4,957,248 A * | 9/1990 | Schmidt ..................... | 242/385.2 |
| 5,192,035 A | 3/1993 | Dufour | |
| 5,297,752 A * | 3/1994 | Brown et al. ............... | 242/375.3 |
| 5,380,066 A | 1/1995 | Wiseman et al. | |
| 5,492,285 A | 2/1996 | Hamrick | |
| 6,416,009 B1 | 7/2002 | Iaciofano et al. | |
| 7,275,710 B2 | 10/2007 | VanDruff et al. | |
| 7,837,275 B2 | 11/2010 | Woellert et al. | |
| 7,905,233 B2 | 3/2011 | Hopper | |
| 2010/0115695 A1 | 5/2010 | White et al. | |

OTHER PUBLICATIONS

Ferno, Inc., "Model 417-1 Harness Restraint," Jan. 2013.

* cited by examiner

*Primary Examiner* — Sang Kim
(74) *Attorney, Agent, or Firm* — PatentBest; Andrew McAleavey

(57) ABSTRACT

A locking retractor is disclosed, as are stretchers and cots using the retractor to secure a patient. The retractor includes structure for locking the retractor spool to prevent rotation in both directions. However, a cam is coupled to the shaft and is arranged relative to the locking structure to prevent the spool from locking during an initial portion of the spool's rotation, until a first locking point is reached. Once the first locking point has been reached, a clutch prevents the locking structure from engaging while the spool is still rotating, but the locking structure will engage to lock the spool in both directions once active rotation stops. A user-actuatable lever is provided externally that disengages the locking structure when actuated to allow the spool to extend and retract freely.

24 Claims, 9 Drawing Sheets

BI-DIRECTIONAL LOCKING RETRACTOR

CROSS-REFERENCE TO RELATED APPLICATIONS

This application claims priority to, and the benefit of, U.S. Provisional Patent Application No. 61/761,017, filed on Feb. 5, 2013. The entire contents of that application are incorporated by reference herein.

BACKGROUND OF THE INVENTION

1. Field of the Invention

In general, the invention relates to passenger and patient restraints for ambulances, and more specifically, to a bi-directional locking retractor for restraint systems.

2. Description of Related Art

Seat restraints for passenger vehicles are well established, ubiquitous, and regulated by equally well-established standards. The most common forms of seat restraints are the lap belt, which crosses the passenger's hips, and the shoulder belt, which extends over the shoulder and diagonally across the chest. The belts are held, and their extension controlled, by retractors.

A typical retractor comprises a spool of webbing connected to a mechanism that tensions the webbing and controls its extension in some way. The most basic type of retractor is the automatic locking retractor (ALR), which locks when the webbing is no longer being actively withdrawn from the spool. From that point, the webbing cannot be pulled out farther without first allowing the webbing to retract completely.

The most common type of retractor in passenger seat restraints is the emergency locking retractor (ELR). ELRs come in two main types, "speed sensitive" and "vehicle sensitive." Speed sensitive ELRs allow the belt webbing to be withdrawn and extended, keep the webbing under tension so that it is biased toward retraction, and are sensitive to the speed at which the webbing comes off the spool. If the webbing comes off the spool too quickly, indicating a sudden deceleration and consequent belt extension, the ELR locks the webbing, and in so doing, holds the passenger in place. Vehicle sensitive ELRs include an angular sensor that senses and responds to the angular position of the vehicle and locks the belt webbing if the vehicle's angle changes suddenly or moves beyond a defined threshold. In some cases, "dual sensitive" ELRs combine the functionality of speed sensitive and vehicle sensitive ELRs and lock the retractor if the webbing is coming off the spool too quickly or if the angle of the vehicle changes suddenly or moves beyond a defined threshold.

While seat restraints in typical passenger vehicles are well established, restraints for passengers, patients, and emergency medical personnel in ambulances are still evolving, and standards are still being established. A few systems have been created to meet the specific challenges of the ambulance environment. For example, U.S. Pat. No. 7,832,770 discloses a restraint system that addresses the unique issues of riding in and providing care from a side- or rear-facing seat in the back of an ambulance. This restraint system has shoulder straps with positioning straps that keep the shoulder straps in place, and it allows the seated emergency medical technician (EMT) to move enough to provide care while seated. In an accident, the shoulder straps are designed to stay in place, restraining the EMT.

Restraining a patient on a stretcher in the rear of an ambulance presents an even greater challenge. Proper passenger restraint and minimizing "excursion" (i.e., movement) during a collision are important considerations, as they would be with any restraint system. However, other considerations come into play. For example, a trauma patient may have bone fractures and other internal injuries, in which case immobilizing the patient in a way that prevents further injury is of prime importance.

Additionally, patients are typically carefully "packaged" or prepared for transport in a way that attempts to stabilize their existing injuries and prevent further injury during transport. For example, if a patient requires spinal stabilization, he or she may be placed in a cervical collar and secured to a rigid backboard before that backboard is placed on and secured to a stretcher for transport. With all those layers of packaging and restraint, extraneous or loose restraints may interfere with or complicate packaging, become tangled, and risk further injury to the patient.

Typically, manually adjusted restraints are used on a patient stretcher. These include manually tensioned shoulder straps that extend down from the shoulders, where they meet and connect with a chest strap that extends transversely across the body. Separate transverse straps may be used to restrain the pelvis and the legs. These systems must be manually adjusted to the appropriate positions and levels of tension, which is time consuming. Moreover, any loose webbing remaining after belt length adjustment can interfere with packaging, as described above.

If retractors were installed on patient stretchers, they could potentially simplify and standardize the restraint process and avoid problems associated with loose restraints or excess webbing, and there have been attempts to use retractors on patient stretchers. However, their use is problematic, because the constant retracting force applied by most emergency locking-type retractors risks further injury to the patient. Adjusting retractor-mounted straps at the shoulder is also difficult, and improperly positioned shoulder straps can allow too much excursion in a collision, particularly because the patient tends to move forwardly, toward the shoulder straps, in a frontal collision.

SUMMARY OF THE INVENTION

Aspects of the invention relate to locking mechanisms for retractors, to retractors themselves, and to cots or stretchers using the retractors. In particular, one aspect of the invention relates to a retractor. Functionally, the retractor allows webbing to be freely withdrawn from a spool without locking until a first locking point is reached. When the webbing is pulled out beyond the first locking point, the webbing can continue to be withdrawn from the spool, but when active withdrawal ceases, the retractor locks the spool in both directions, fixing the length of the webbing. A release lever on the retractor releases the locking mechanism, allowing the webbing to retract into or be withdrawn from the retractor once again. A spring mechanism is provided that biases the webbing to retract onto the spool unless the locking mechanisms are engaged. Dampers are also provided to control the rate at which the webbing is retracted onto the spool.

Structurally, a retractor according to this aspect of the invention comprises a spool mounted for rotation on a shaft within a support and a locking mechanism. Webbing material is wound around the spool, and the webbing material terminates in connecting structure, such as a tongue, buckle, or link. The locking mechanism comprises several components. A first locking ratchet is coupled to the shaft and has asymmetrical teeth oriented in a first direction. A pivot arm is pivotably mounted relative to the support and is coupled to a lock bar. The lock bar is adapted to engage the teeth of the first locking ratchet to prevent the spool from rotating in a first direction. A second locking ratchet is also coupled to the shaft and has asymmetrical teeth oriented in a second direction. A lever arm is also pivotably mounted relative to the support. The lever arm has a pawl positioned to engage the second locking ratchet to prevent the spool from rotating in a second direction. The lever arm also has a user-actuatable lever extending outwardly from the retractor. The lever is arranged such that, when actuated, the lever disengages the pawl from the second locking ratchet. A cam is coupled to the shaft and adapted to rotate relative to the shaft and support. The cam is constructed and arranged to rotate in a direction opposite a direction of rotation of the shaft. The cam has a gearing ratio relative to the shaft such that it rotates more slowly than the shaft and a cam lobe that extends over a portion of the circumference of the cam. The cam lobe has an initial position and extent that cause it to support the pivot arm during an initial portion of spool rotation. Additionally, a clutch is rotatably mounted relative to the shaft to rotate between first and second positions. The clutch has projecting portions that support the pivot arm and the lever arm while the spool is rotating to prevent engagement with the first and second locking ratchets. A spring cartridge is coupled to the spool to bias the spool to rotate in a direction that causes the webbing to retract, and dampers may be provided to slow the rate at which retraction occurs.

Another aspect of the invention relates to ambulance cots, stretchers, and patient gurneys that use the retractors described above to secure patients. Such retractors may be particularly helpful in immobilizing and securing patients for ambulance transport.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the figures, and in which.

DETAILED DESCRIPTION

Figure 1:
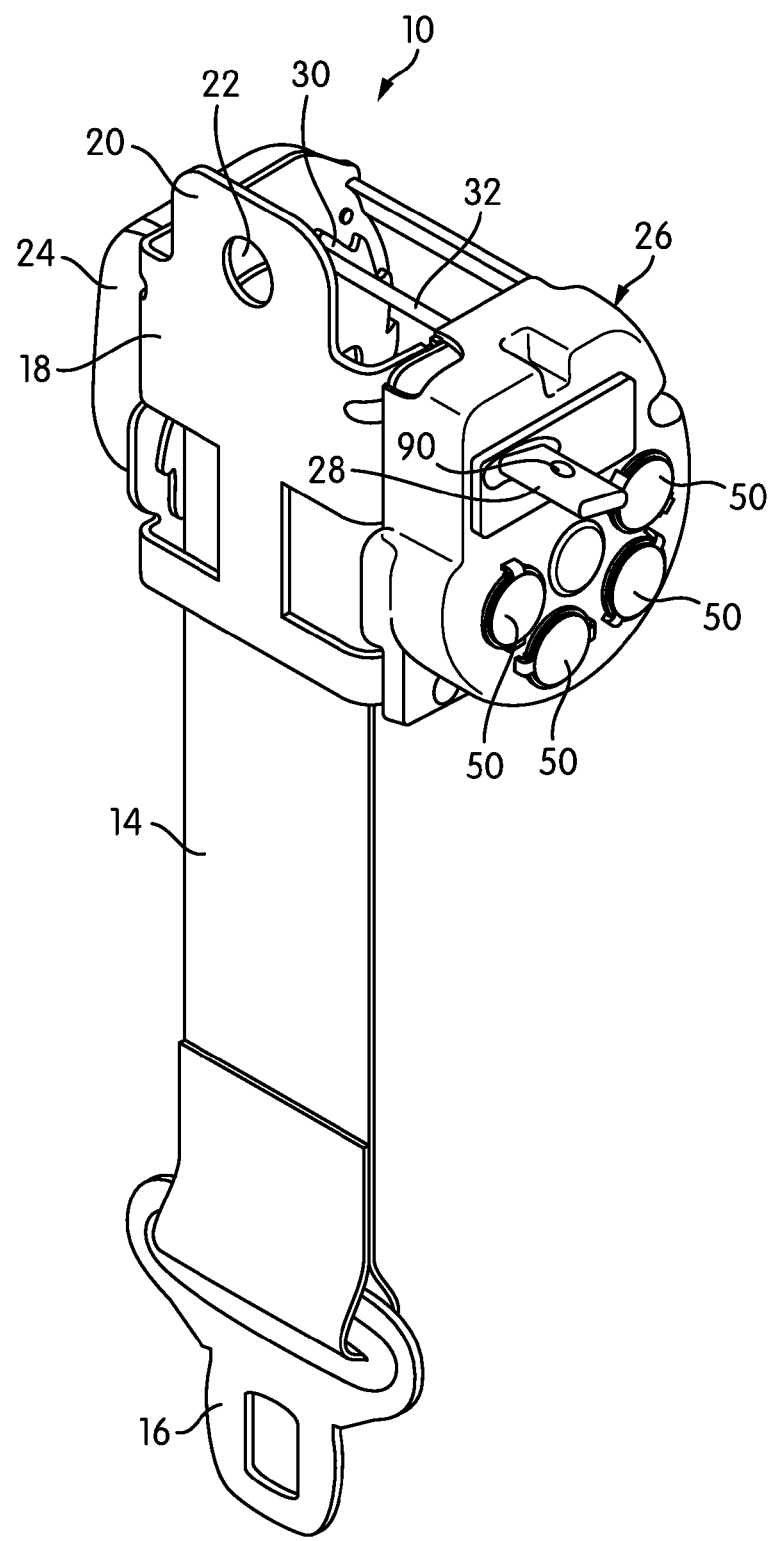
FIG. 1 is a perspective view of a retractor according to one embodiment of the invention, illustrating its main external features.

FIG. 1 is a perspective view of a retractor, generally indicated at 10, according to one embodiment of the invention. The retractor 10 includes a central spool 12 with webbing 14 secured to and wound around the spool 12. (The spool 12 and the portion of the webbing 14 that is wound around the spool 12 are not shown in FIG. 1. The spool 12 can be seen in FIG. 2, an exploded view of the retractor 10.) The webbing 14 terminates in connecting hardware 16, which in the illustrated embodiment comprises a metal tongue.

The nature of the webbing 14 is not critical to the invention, and it may have any characteristics that are known or common in the art. In particular, the webbing 14 and its connecting hardware 16 may comply with the U.S. Federal Motor Vehicle Safety Standards (FMVSS) or any other applicable standards. The webbing 14 is shown with male connecting hardware 16, but it may be provided with female connecting hardware in other embodiments. In general, the connecting hardware 16 may be a tongue, a buckle, a linking connector that allows another strap to be threaded through it, or a Y-harness that allows two straps to be connected to the webbing 14 from a single retractor. Moreover, although the term "webbing" is used here, implying a flexible fabric material, any material that makes a suitable strap for the retractor application may be used. In some embodiments, a fabric webbing may be coated with vinyl or another material that is impregnable or resistant to fluids and other contaminants.

The spool 12 itself is surrounded by a generally U-shaped metal frame 18 which defines the sides and bottom of the retractor 10 and extends upwardly along either side of the spool 12. Along its bottom, the frame 18 acts as a guide for the webbing 14 as it is drawn from and returned to the spool 12. The rearward-most portion of the frame bottom provides a flange or tab 20 with at least one opening 22 allowing it to be attached to an object, such as a stretcher or a vehicle. The opening 22 typically has sufficient size to admit a bolt.

On each side, the spool 12 is coupled to a structure that controls the extension and retraction of the webbing 14. On one side of the spool 12, a standard spring cassette 24 containing a conventional torsional spring is provided. The spring cassette 24 biases the spool 12 to rotate in a direction that causes the webbing 14 to retract.

The retractor 10 also includes a locking mechanism, generally indicated at 26. Many of the components of the locking mechanism 26, including user-actuatable structure, are in an assembly on the side of the spool 12 opposite the spring cassette 24. The locking mechanism 26 provides a selective and position-dependent locking action to prevent the webbing 14 from retracting under certain conditions, as will be explained below in more detail. The locking mechanism 26 includes an external, user-actuatable lever 28 whose function will also be explained below in more detail.

The spool 12 itself is adapted to have its position locked. On each side of the spool 12, a toothed ratchet is provided. An external lock wheel or ratchet 30 is provided on the side of the spool 12 adjacent to the spring cassette 24; another lock wheel or ratchet 30 is adjacent to the locking mechanism 26, although not shown in the perspective of FIG. 1. A lock bar 32 is coupled to the locking mechanism 26 and is movably mounted such that it can mesh with the teeth of the two lock wheels 30 to lock the spool 12.

Figure 2:
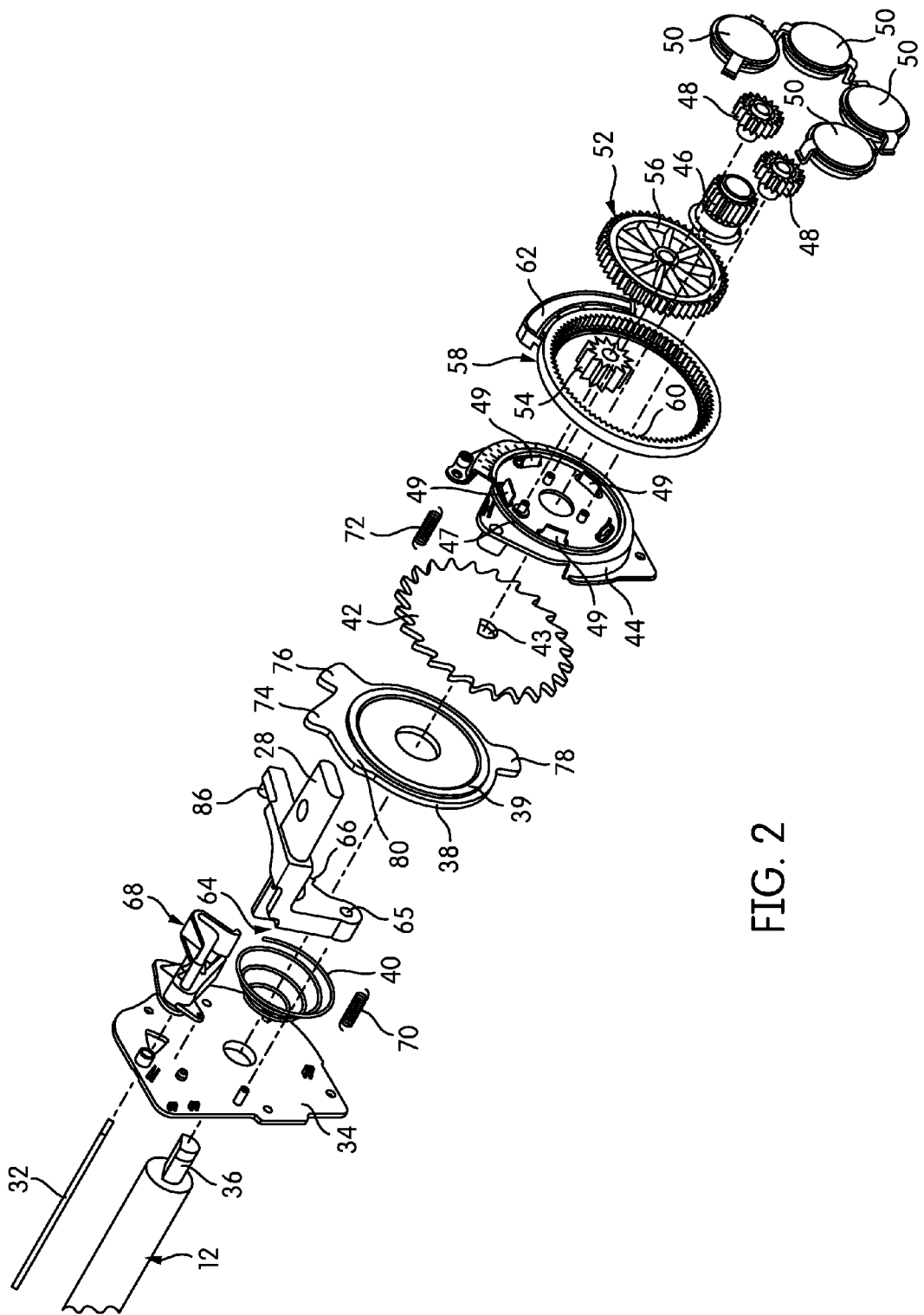
FIG. 2 is an exploded view of one side of the retractor of FIG. 1, illustrating its locking mechanism.

FIG. 2 is an exploded view of the retractor 10, focusing particularly on the components of the locking mechanism 26. The spool 12 is connected to a keyed shaft 36 that extends outwardly from it. Internally, the locking mechanism 26 has a base plate 34 that lies closest to the exterior surface of the frame 18 in which the spool 12 is mounted, and the keyed shaft 36 connected to the spool 12 extends through the frame 18 and the base plate 34. The shaft 36 rotates with the spool 12. A clutch 38 lies overtop the base plate 34 and the shaft 36 passes through it, with a compression spring 40 interposed between the base plate 34 and the clutch 38 to bias the clutch 38 outwardly from the base plate 34 and into engagement with the other components. As will be described below in more detail, the clutch 38 has some cam-like functions in addition to its functions as a clutch, and is shaped and arranged accordingly.

Overtop the clutch 38, another ratchet-type gear 42 with asymmetrical teeth is installed and also receives the shaft 36. The gear 42 has a keyed opening 43 that allows it to receive and be directly driven by the shaft 36. The clutch 38 is biased by the compression spring 40 to press against and frictionally engage the gear 42, and has a raised ring 39 of material that extends toward the gear 42 for that purpose. The dimensions and / or proportions of the raised ring 39 may be increased to increase the surface area for frictional contact between the ring 39 and the gear 42. Thus, the clutch 38 generally rotates with the gear 42.

A cover 44 lies overtop of the gear 42 and allows the shaft 36 to pass. Beyond the cover 44, a drive gear 46 is inserted over the shaft 36 so that it is driven by the shaft 36. A number of smaller gears 48 are driven by the drive gear 46 on the shaft 36. These smaller gears 48 interface with and mesh with gears (not shown in FIG. 2) from a number of dampers 50. The dampers 50 are provided to slow the rate at which the spool 12 rotates. Specifically, the force exerted on the spool 12 by the spring cassette 24 would generally cause the webbing 14 to retract very rapidly, absent some outside influence. However, such rapid retraction may injure a patient or passenger secured by the webbing 14. Therefore, the dampers 50 are provided to slow the rate of retraction and prevent injury.

A cam drive gear set 52 is also driven by the drive gear 46 on the shaft 36. The cam drive gear set 52 includes a larger gear 56. The larger gear 56 is positioned in the same plane as and is engaged and driven by the drive gear 46. A smaller gear 54 on the same shaft as and below the larger gear 56 meshes with the interior gear teeth 60 of a cam 58. The smaller gear 54 may be a part of and formed integrally with the larger gear 56. However, for ease in explanation and illustration, the smaller gear 54 is exploded from the larger gear 56 in the view of FIG. 2.

Overall, the cam 58 has a generally circular, ringlike shape, and is adapted to rotate within a groove or race 47 defined in the cover 44. The cover 44 includes a number of snap-fit tabs 49 that retain the cam 58 in engagement with the cover 44 and its groove or race 47. Thus, when installed, the cam 58 sits against the cover 44 and beneath the larger gear 58. The cam 58 has a major cam lobe 62.

Two main components are responsible for positively and bi-directionally locking the spool 12 such that it cannot rotate. The external lever 28 is a part of a lever arm 64, an L-shaped component that is pivotably mounted to the base plate 34. Proximate to its pivot 65, the lever arm 64 includes a pawl 66 positioned to engage the ratchet gear 42 on the shaft 36. The asymmetrical teeth of the gear 42 are angled such that when the pawl 66 of the lever arm 64 is engaged with them, the spool 12 is prevented from rotating in a direction that allows retraction.

The locking mechanism 26 also includes a pivot arm 68, which is pivotably connected to the lock bar 32, a connection that allows it to rotate about the base plate 34. When the pivot arm 68 is pivoted down, the lock bar 32 drops into engagement with the lock wheels 30, preventing the webbing from extending. (The lock wheels 30 and the ratchet-type gear 42 have asymmetrical teeth angled in generally opposite directions, allowing one to prevent the spool 12 from rotating in one direction when engaged while the other prevents the spool 12 from rotating in the other direction when engaged.)

As can be seen in FIG. 2, the lever arm 64 and pivot arm 68 have significant width. As will be described below in greater detail, the width of the pivot arm 68 is great enough that it can be supported by either or both of the clutch 38 or the lobe 62 of the cam 58, and the lever arm 64 is similarly wide.

The lever arm 64 is biased to return to its original position by a tension spring 70 connected between the lever arm 64 and a post on the cover 44. Similarly, the pivot arm 68 is biased to return to its original position by a similar tension spring 72 connected between the pivot arm 68 and the base plate 34.

In general, the components of the retractor 10 may be made of any conventional materials. For example, the components may be made of a metal, such as steel or aluminum, and may be stamped or cast. However, other materials may be used for certain components. For example, the clutch 38 and some of the gearing components may be made of a resin in some embodiments, e.g., a DELRIN® acetal resin, such as DELRIN® 500.

Figure 3:
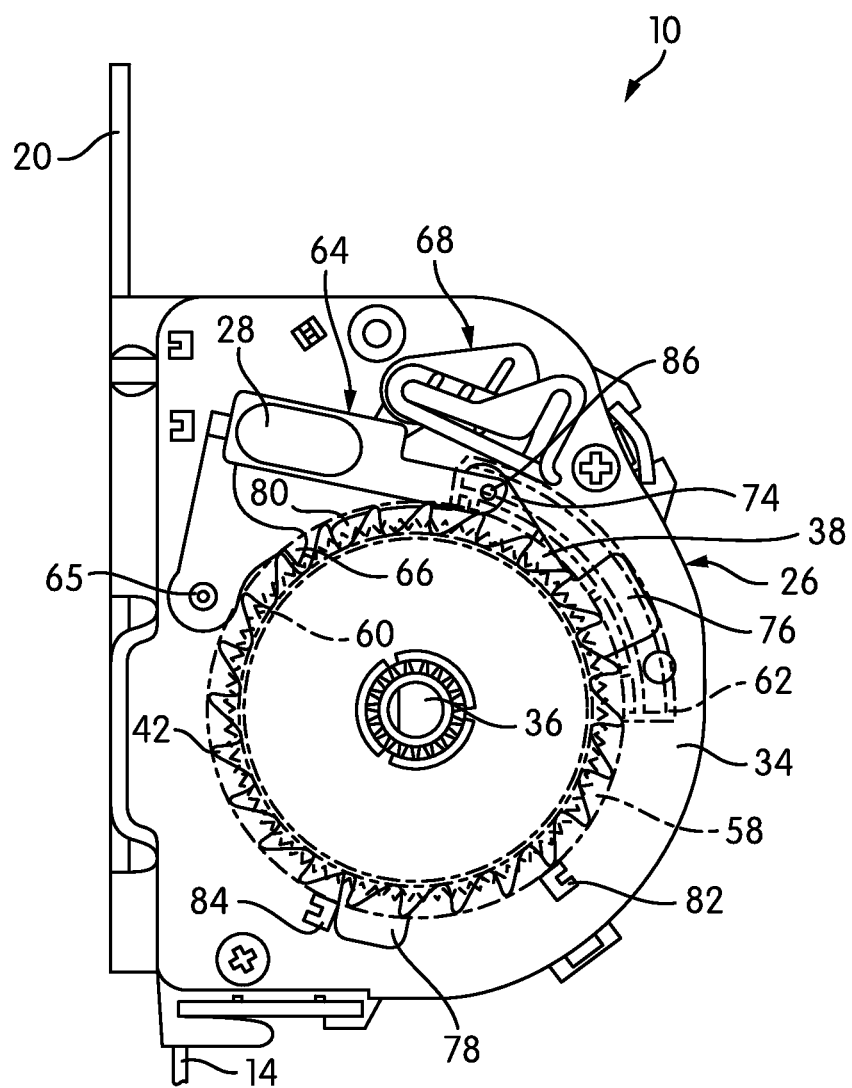
FIG. 3 is a schematic side elevational view of the retractor of FIG. 1 in its initial position with webbing fully retracted and with certain components removed and other components shown in phantom lines to illustrate the workings of the retractor more clearly.

FIG. 3 is a somewhat schematic elevational view of the retractor 10 and locking mechanism 26 with certain components removed and others shown in phantom (i.e., dotted) lines to illustrate the positions and movements of the clutch 38, the cam 58, the gear 42, the lever arm 64, and the pivot arm 68. Specifically, FIG. 3 illustrates the positions of the components 38, 58, 42, 64, 68 with the webbing 14 fully retracted and the retractor 10 fully at rest.

As shown in FIG. 3, the cam 58 is positioned such that its lobe 62 holds the pivot arm 68 up, thus preventing the lock bar 32 from engaging the lock wheels 30. With the lobe 62 of the cam 58 supporting the pivot arm 68, the webbing 14 can extend.

When the webbing 14 is pulled out from the spool 12, the spool 12 rotates in a counterclockwise direction with respect to FIG. 3. Meanwhile, because of the gearing that couples the cam 58 to the spool 12, the cam 58 rotates in a direction opposite that of the spool 12, i.e., clockwise with respect to the illustration of FIG. 3. The gearing ratio between the larger gear 56 that drives the cam 58 and the teeth 60 of the cam 58 itself also causes the cam to rotate much more slowly than the spool 12 itself. The gearing ratio may be, for example about 0.056.

As the webbing 14 continues to be pulled from the spool 12, the cam 58 will eventually rotate enough so that its lobe 62 is no longer in position to support the pivot arm 68. Functionally, while the cam lobe 62 supports the pivot arm 68, the webbing 14 can be extended freely and will neither retract nor lock to prevent further extension if the user stops pulling the webbing 14 from the spool 12. Thus, the rotation speed of the cam 58 and the length of the cam lobe 62 define a distance that the webbing 14 can be freely extended without triggering the locking mechanism 26 to prevent further extension. In this description, the point beyond which the locking mechanism 26 will lock to prevent further extension is referred to as the "first locking point." For example, in one embodiment, the dimensions of the cam 58, its lobe 62, and the gearing ratio may be set such that the first locking point is reached (i.e., the cam lobe 62 clears the pivot arm 68) when a pre-determined length of about 12 inches of webbing 14 has been withdrawn from the spool 12.

Figure 4:
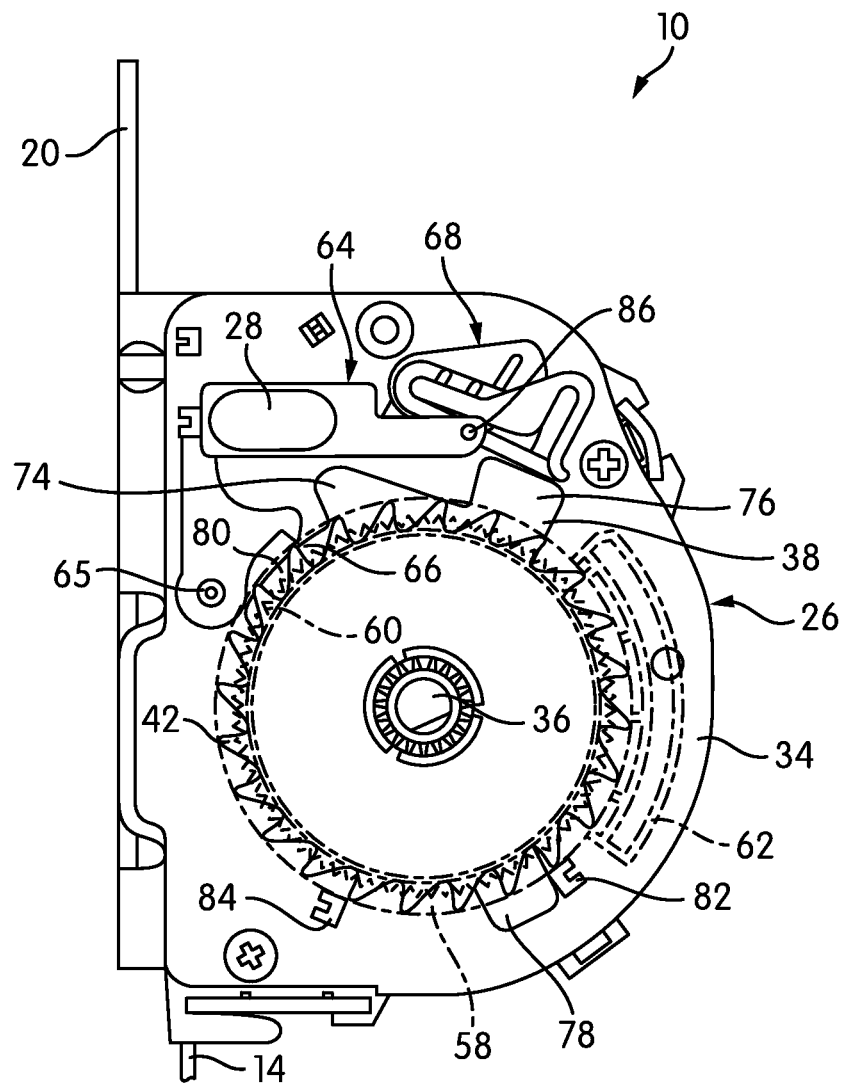
FIG. 4 is a schematic side elevational view of the retractor similar to that of FIG. 3, illustrating the position of the components after a first locking point has been reached and while webbing is still being withdrawn from the retractor.

FIG. 4 is a schematic side elevational view of the locking mechanism 26 after the cam lobe 62 has rotated away from the pivot arm 68 and while the webbing 14 is still being retracted from the spool 12. Functionally, once the first locking point has been reached, the webbing 14 can continue to extend, but once active extension has stopped and the force exerted by the spring cassette 24 causes the spool 12 to rotate in reverse and slightly retract the webbing 14, the locking mechanism 26 will lock the spool 12 in both directions. To accomplish this, the clutch 38 frictionally engages and rotates with the gear 42, while its outer shape gives it a cam-like functionality and allows it to move and coordinate the movements of the lever arm 64 and the pivot arm 68.

As can be seen best in FIG. 2, the clutch 38 is basically round, but its profile deviates from round in several locations. Three main protrusions 74, 76, 78 extend from the clutch 38, the circumference of which also includes a shelf area 80. One of the protrusions 78 is positioned between two mechanical stops 82, 84 attached to the base plate 34, and in that position, limits the clutch 38 to rotate between positions defined by the stops 82, 84. The other protrusions 74, 76 and the shelf area 80 are positioned to support and coordinate the movements of the pivot arm 68 and lever arm 64, as will be explained below in more detail.

As shown in FIG. 4, while the webbing 14 continues to extend and the spool 12 continues to rotate, one of the protrusions 76 on the clutch 38 supports the pivot arm 68. This allows the spool 12 to continue to rotate and allow the webbing 14 to be extended. The pawl 66 of the lever arm 64 is also lifted by the shelf area 80 of the clutch 38, keeping it out of engagement with the gear 42.

Figure 5:
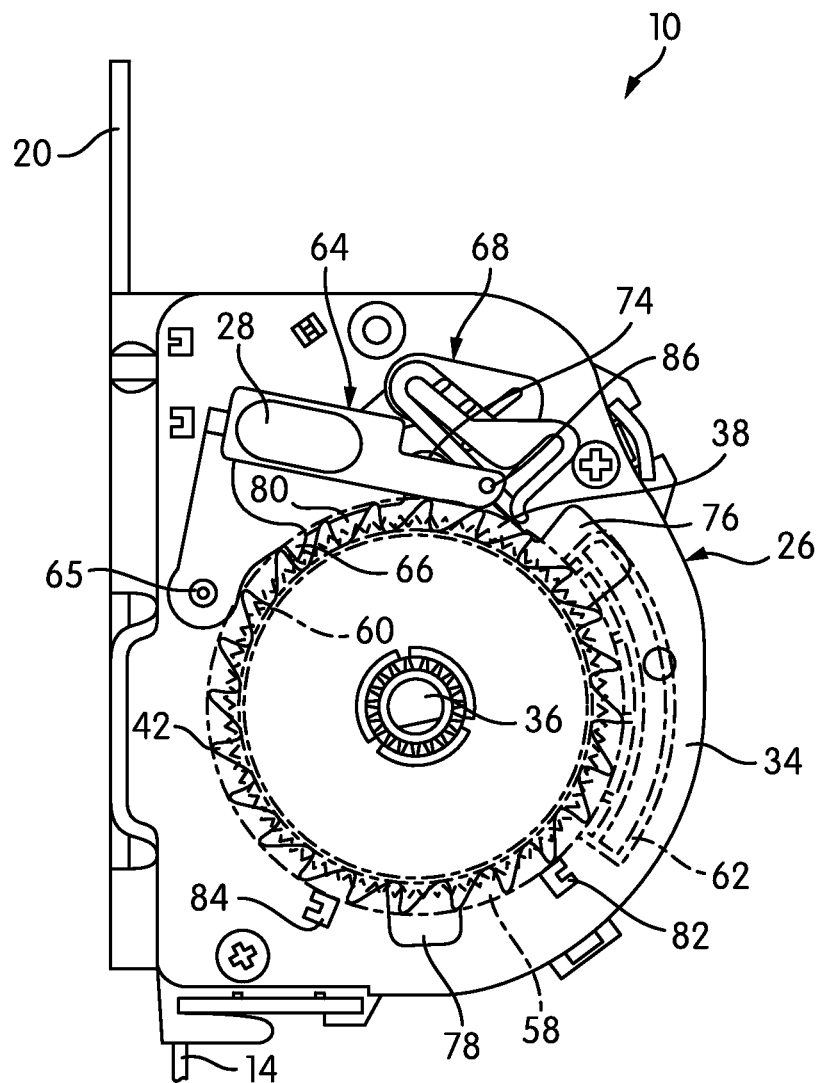
FIG. 5 is a schematic side elevational view of the retractor similar to that of FIG. 3, illustrating the position of the components after the first locking point once a user stops withdrawing webbing from the retractor, in which case it is locked in both directions.

FIG. 5 illustrates the arrangement of the components as a user stops withdrawing the webbing 14 from the spool 12. Once a user stops actively withdrawing the webbing 14 from the spool 12, the force exerted by the spring cassette 24 causes the spool 12 to counter-rotate slightly. The clutch 38, which rotates with the gear 42 that is connected to the spool 12 via its shaft 36, also rotates in that direction, and thus, its protrusion 78 is caused to rotate toward its other stop 84, while the protrusion 76 that had been supporting the pivot arm 68 rotates away from it, thus dropping the pivot arm 68 and allowing the lock bar 32 connected to it to drop into engagement with the lock wheels 30 to prevent more webbing 14 from being withdrawn from the spool 12. At the same time, the shelf area 80 of the clutch 38, which has been positioned so that it keeps the pawl 66 of the lever arm 64 from engaging the gear 42, also rotates out of the way, dropping the lever arm 64 and the pawl 66 to engage the gear 42. This stops the spool 12 from rotating in either direction and locks the retractor 10 with the components in the position shown in FIG. 5.

Figure 6:
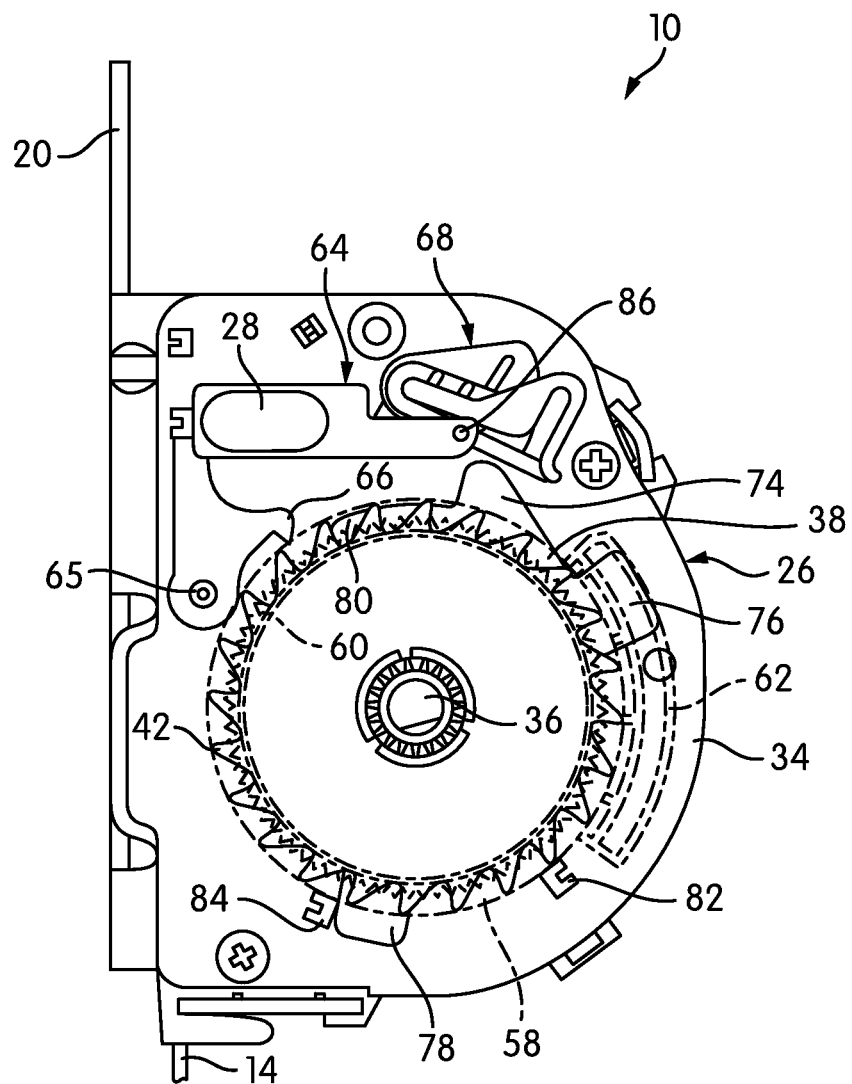
FIG. 6 is a schematic side elevational view of the retractor similar to that of FIG. 3, illustrating the position of the components once the external lever is depressed to release the retractor for webbing extension and retraction.

FIG. 6, a schematic side elevational view similar to FIG. 5, illustrates the position of the components when the external lever 28 is actuated in the direction of the bottom of the frame 18 to release the spool 12. When the lever 28 is actuated, the pawl 66 is rotated out of the way of and disengages from the ratchet gear 42, releasing the spool 12 to retract. An inwardly-extending post 86 on the upper end of the lever arm 64 (best seen in FIG. 2) pushes the pivot arm 68 up, thus disengaging the lock bar 32. Thus, the spool 12 is free to rotate in either direction and webbing 14 can be withdrawn from or retracted into the spool 12 freely while the external lever 28 is still depressed.

Figure 7:
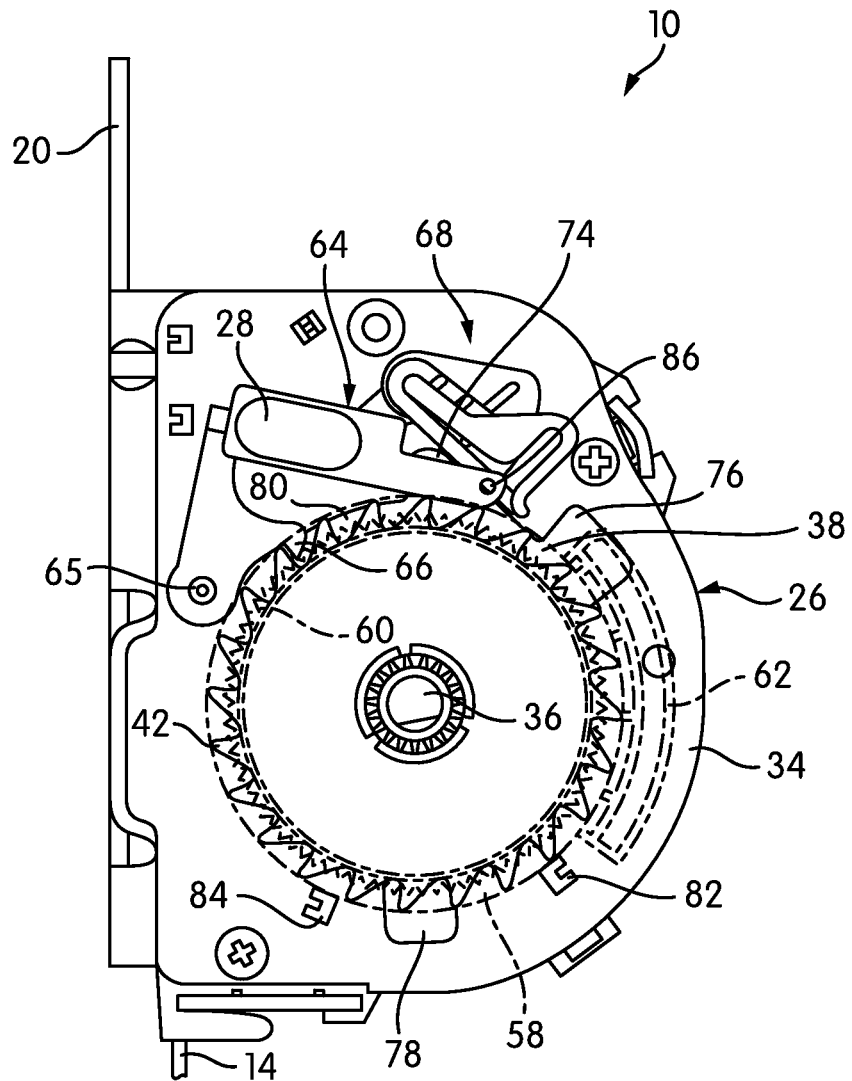
FIG. 7 is a schematic side elevational view of the retractor similar to that of FIG. 6, illustrating the position of the components once the external lever is released.

FIG. 7, a schematic side elevational view similar to FIG. 6, illustrates what happens when the lever 28 is released before all of the webbing 14 has retracted back into the retractor 10. Specifically, the pivot arm 68 drops, lowering the lock bar 32 with it, and the pawl 66 of the lever arm 64 rotates back into engagement with the ratchet gear 42. This happens because the clutch 38 is only positioned to support these components 64, 68 while the spool 12 is rotating. Thus, when the lever 28 is released, the retractor 10 is once again locked in both directions.

Of course, if the lever 28 is actuated and held down (i.e., held in the position illustrated in FIG. 6), the spool 12 will be free to rotate in both directions, and the force exerted by the spring cassette 24 will cause the spool 12 to rotate in a direction that retracts the webbing 14. Thus, to return the retractor 10 to the position illustrated in FIG. 3, a user need only hold down the lever 28 long enough to allow all of the webbing 14 to retract.

Figure 8:
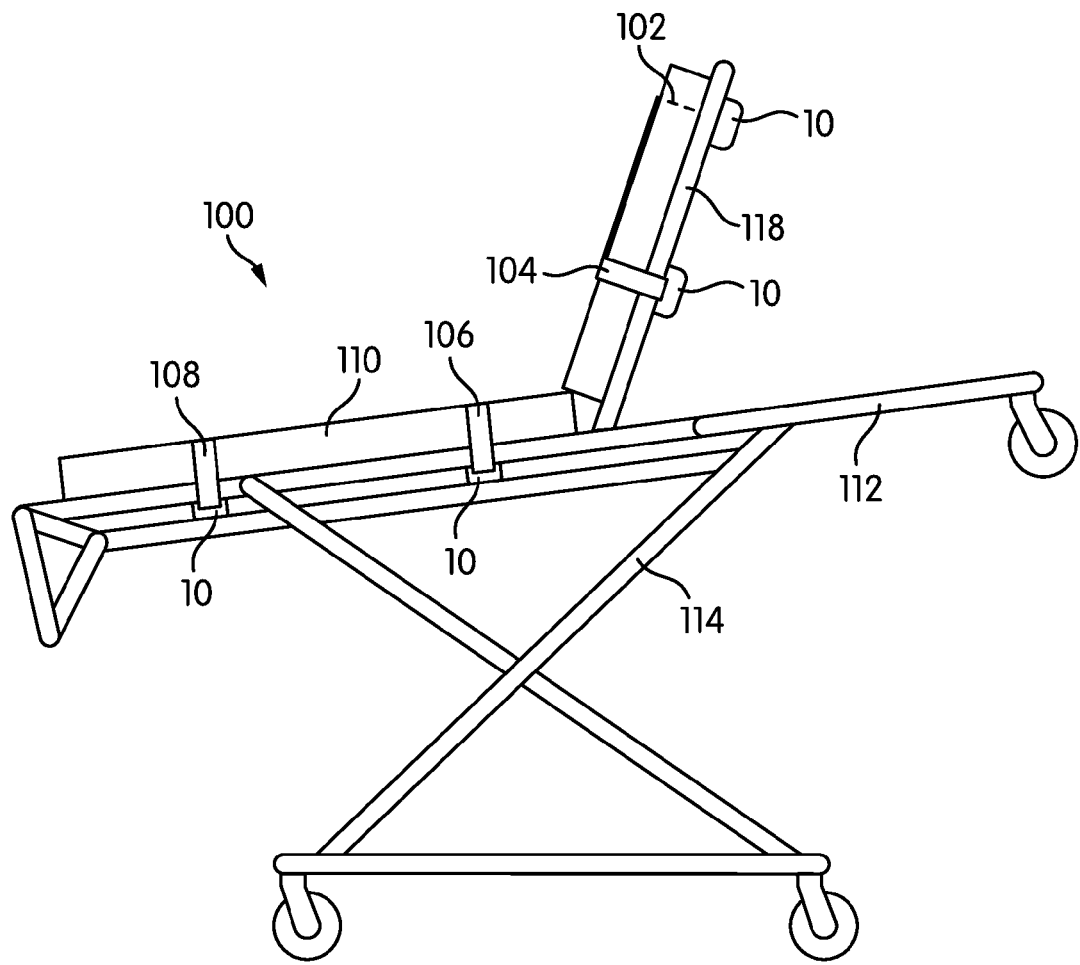
FIG. 8 is a side elevational view of a patient stretcher with retractors installed.

One or more retractors 10 may be installed on an ambulance cot, patient stretcher, or gurney. FIG. 8 is a side elevational view of an ambulance cot, generally indicated at 100. The ambulance cot 100 has a number of retractors 10 installed on it in various positions to tension shoulder 102, chest 104, pelvis 106, and lower body straps 108. The straps 102, 104, 106, 108 secure a patient to a pad or cushion 110 on a frame 112. In particular, in the embodiment of FIG. 8, the shoulder straps 102 go through an opening in the cushion 110 and emerge in a position directly above the point at which a patient's shoulders would be positioned, although that need not be the arrangement in all embodiments. The ambulance cot 100 has a pivoted, X-shaped lower portion 114 that allows its height to be adjusted either to a standard gurney height or for transport within an ambulance.

The manner in which the retractors 10 are mounted and the manner in which they are arranged to tension the straps may vary from stretcher to stretcher and embodiment to embodiment. In one embodiment, two retractors 10 may be mounted directly under the fowler 116, the reclining part of the frame 112. In another embodiment, a single retractor 10 may be mounted farther down on the frame 112, essentially under the patient's pelvis, and may run up the underside of the frame 112, where its webbing 14 is connected to a Y-harness that is, in turn, connected to the straps.

In general, an advantage of retractors 10 according to embodiments of the invention is that they can be placed in and attached to out-of-the-way locations on the frame 112 where it was not previously possible to attach straps because doing so would have involved an unwieldy and potentially dangerous amount of excess, slack webbing.

In some embodiments, several retractors 10 may be configured such that their external release levers 28 can be actuated simultaneously. An opening 90 (best seen in FIG. 1) in each of the external levers 28 allows them to be connected with a wire or cable, which may, in turn, be connected to a button, lever, or other actuation component for easy release, such that a single motion or actuation can release multiple retractors. Moreover, because retractors 10 allow more flexibility in how they are placed on the frame 112, several retractors could be placed near one another, thus simplifying a mechanism that releases several of them simultaneously.

In the retractor 10, the external lever 28 extends out of the side of the retractor 10. However, some configurations and installations of the retractor 10 may make that position difficult to access. For that reason, retractors according to other embodiments of the invention may be configured such that their external levers extend out of the retractor in other directions.

Figure 9:
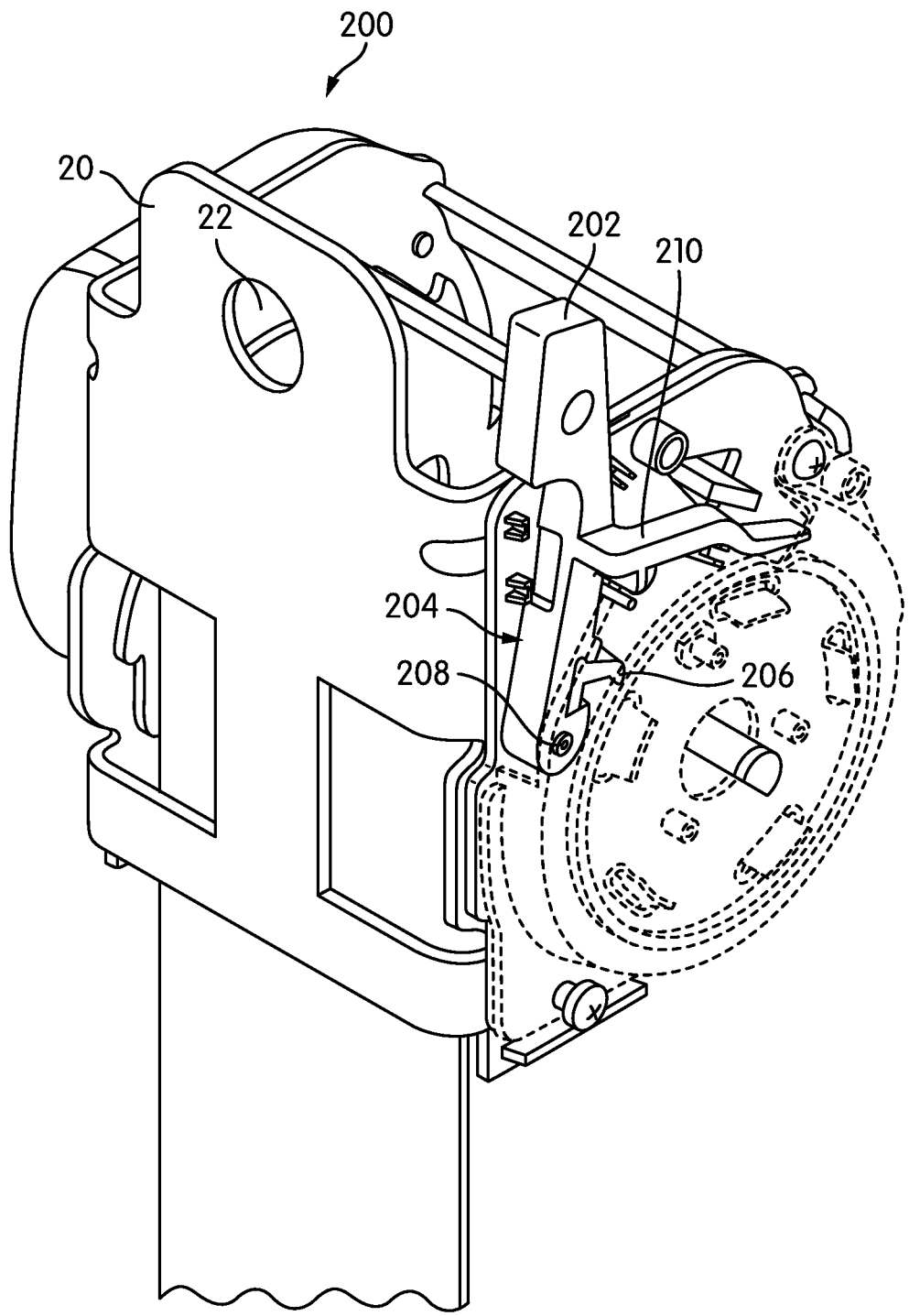
FIG. 9 is a schematic perspective view of a retractor according to another embodiment of the invention.

For example, FIG. 9 is a perspective view of a retractor 200 according to another embodiment of the invention. The retractor 200 has an external lever 202 that extends in the same direction as the flange or tab 20. As can be seen in FIG. 10, the lever arm 204 of the retractor 200 has a slightly different shape as well, extending generally straight to a pawl 206 and pivot 208, and with an upper leg 210 that is generally perpendicular and extends upwardly, where it interfaces with the pivot arm 68. The other components of the retractor 200 may be assumed to be essentially the same as in the retractor 10.

It should be understood that retractors 10 according to embodiments of the invention may be used in many different contexts and in conjunction with many different types of equipment. More particularly, retractors 10, 200 may be used with ambulance cots, stretchers, and gurneys, in other specialized vehicular applications, and in any application in which positive, bidirectional locking is useful.

It should also be understood that although the external levers 28, 202 are shown in the illustrated embodiments as being actuated downwardly, the sense of the motion is not critical and may be opposite in other embodiments.

While the invention has been described with respect to certain embodiments, the embodiments are intended to be illustrative, rather than limiting. Modifications and changes may be made within the scope of the invention, which is defined by the appended claims.

What is claimed is:

1. A locking mechanism for a retractor, comprising:
   a pivot arm coupled to a lock bar, the lock bar being adapted to engage a first ratchet to prevent retractor spool rotation in a first direction;
   a lever arm pivotably mounted within the retractor, the lever arm including an external lever that extends outwardly from the retractor, a pawl that is adapted to engage a second ratchet to prevent retractor spool rotation in a second direction, and a portion that couples the lever arm to the pivot arm to move the pivot arm when the external lever is actuated;
   a cam coupled to a shaft of the refractor spool by a mechanism that causes it to rotate in a direction opposite and at a rate slower than a velocity of the retractor spool, the cam having a lobe initially positioned to support the pivot arm and prevent engagement of the lock bar with the first ratchet during an initial rotation of the retractor spool to a first lock point; and
   a clutch coupled to the shaft to rotate between defined rotational positions, the clutch having a shape that supports the pivot arm and prevents engagement of the lock bar with the first ratchet, and supports the pawl of the lever arm to prevent engagement with the second ratchet while the spool is rotating.

2. The locking mechanism of claim 1, further comprising dampers coupled to the shaft of the retractor.

3. The locking mechanism of claim 1, further comprising a spring arranged to bias the clutch into frictional engagement with the second ratchet.

4. The locking mechanism of claim 1, wherein the clutch is generally circular in shape with a plurality of outward projections.

5. The locking mechanism of claim 1, wherein the cam has a generally circular circumference and the lobe projects from the circumference.

6. The locking mechanism of claim 1, wherein the external lever of the lever arm includes an opening therein.

7. A retractor, comprising:
   a spool mounted for rotation on a shaft within a support; and
   a locking mechanism comprising
   a first locking ratchet coupled to the shaft, the first locking ratchet having asymmetrical teeth oriented in a first direction;
   a pivot arm pivotably mounted relative to the support and coupled to a lock bar, the lock bar being adapted to selectively engage the asymmetrical teeth of the first locking ratchet to prevent the spool from rotating in a first spool direction;
   a second locking ratchet coupled to the shaft, the second locking ratchet having asymmetrical teeth oriented in a second direction;
   a lever arm pivotably mounted relative to the support, the lever arm having
      a pawl positioned and adapted to engage the second locking ratchet to prevent the spool from rotating in a second spool direction, and
      a user-actuatable lever extending outwardly of the refractor, the lever being constructed and arranged such that, when actuated, the lever disengages the pawl from the second locking ratchet;
   a cam coupled to the shaft and adapted to rotate relative to the shaft and support, the cam being constructed and arranged to rotate in a direction opposite a direction of rotation of the shaft, the cam having
      a gearing ratio relative to the shaft such that it rotates more slowly than the shaft, and
      a cam lobe extending over a portion of the circumference of the cam, the cam lobe having a position and extent that cause it to support the pivot arm during an initial portion of spool rotation; and
   a clutch rotatably mounted relative to the shaft to rotate between first and second positions, the clutch having projecting portions that support the pivot arm and the lever arm while the spool is rotating to prevent engagement with the first and second locking ratchets, respectively.

8. The retractor of claim 7, further comprising webbing or strap material wound around the spool, the webbing or strap material having an engaging structure at a first, outermost end thereof.

9. The retractor of claim 8, further comprising a spring cartridge coupled to the shaft, the spring cartridge being arranged relative to the shaft to resiliently bias and drive the webbing or strap material to retract.

10. The retractor of claim 9, further comprising one or more dampers coupled to the shaft, the dampers being constructed and arranged to slow a rate at which the webbing or strap material is driven to retract by the spring cartridge.

11. The retractor of claim 10, wherein the support is a generally U-shaped bracket that supports the spool and the shaft on both sides thereof.

12. The retractor of claim 11, wherein the spring cartridge is mounted on one side of the support and the locking mechanism is mounted on the other side of the support.

13. The retractor of claim 7, wherein the user-actuatable lever includes an opening therein.

14. A patient support, comprising:
   a frame adapted to support a patient;
   one or more straps connected to the frame and positioned to secure a patient to the frame; and
   one or more retractors connected to the straps, each of the one or more retractors having
      a spool mounted for rotation on a shaft within a support; and
      a locking mechanism comprising
      a first locking ratchet coupled to the shaft, the first locking ratchet having asymmetrical teeth oriented in a first direction;
      a pivot arm pivotably mounted relative to the support and coupled to a lock bar, the lock bar being adapted to selectively engage the asymmetrical teeth of the first locking ratchet to prevent the spool from rotating in a first spool direction;
      a second locking ratchet coupled to the shaft, the second locking ratchet having asymmetrical teeth oriented in a second direction;
      a lever arm pivotably mounted relative to the support, the lever arm having
         a pawl positioned and adapted to engage the second locking ratchet to prevent the spool from rotating in a second spool direction, and
         a user-actuatable lever extending outwardly of the refractor, the lever being constructed and arranged such that, when actuated, the lever disengages the pawl from the second locking ratchet;
      a cam coupled to the shaft and adapted to rotate relative to the shaft and support, the cam being constructed and arranged to rotate in a direction opposite a direction of rotation of the shaft, the cam having
         a gearing ratio relative to the shaft such that it rotates more slowly than the shaft, and
         a cam lobe extending over a portion of the circumference of the cam, the cam lobe having a position and extent that cause it to support the pivot arm during an initial portion of spool rotation; and
      a clutch rotatably mounted relative to the shaft to rotate between first and second positions, the clutch having projecting portions that support the pivot arm and the lever arm while the spool is rotating to prevent engagement with the first and second locking ratchets, respectively.

15. The patient support of claim 14, further comprising a pad or cushion on an upper portion thereof.

16. The patient support of claim 14, wherein the patient support is wheeled.

17. The patient support of claim 14, wherein the frame is adjustable in height.

18. The patient support of claim 14, wherein the one or more retractors each further comprise webbing or strap material wound around the spool, the webbing or strap material having an engaging structure at a first, outermost end thereof.

19. The patient support of claim 18, wherein the one or more retractors each further comprise a spring cartridge coupled to the shaft, the spring cartridge being arranged relative to the shaft to resiliently bias and drive the webbing or strap material to retract.

20. The patient support of claim 19, wherein the one or more retractors each further comprise one or more dampers coupled to the shaft, the dampers being constructed and arranged to slow a rate at which the webbing or strap material is driven to retract by the spring cartridge.

21. The patient support of claim 20, wherein the support is a generally U-shaped bracket that supports the spool and the shaft on both sides thereof.

22. The patient support of claim 21, wherein the spring cartridge is mounted on one side of the support and the locking mechanism is mounted on the other side of the support.

23. The patient support of claim 14, wherein the user-actuatable lever includes an opening therein.

24. A locking mechanism for a retractor, comprising:
   first locking means for preventing the rotation of a retractor spool in a first rotational direction;
   second locking means for preventing the rotation of the retractor spool in a second rotational direction;
   first locking prevention means for preventing the second locking means from engaging during an initial length of extension of webbing from the retractor spool;
   second locking prevention and coordination means for preventing the first locking means and the second locking means from engaging while the webbing is being actively withdrawn from the retractor spool, such that, after the initial length of extension, if the active withdrawal of the webbing from the retractor spool stops, the retractor spool is locked in both the first and the second rotational directions; and
   retraction means for biasing the retractor spool to rotate in a direction that causes the webbing to retract into the retractor;
   wherein the second locking means includes a user-actuatable disengagement means for disengaging the first locking means and the second locking means when actuated and for as long as actuated.

* * * * *